US012659192B2

(12) United States Patent
Fujii et al.

(10) Patent No.: US 12,659,192 B2
(45) Date of Patent: Jun. 16, 2026

(54) SYSTEM FOR PERFORMING PROPAGATION CHANNEL ESTIMATION BY COOPERATION BETWEEN BASE STATIONS

(71) Applicant: SoftBank Corp., Tokyo (JP)

(72) Inventors: Takafumi Fujii, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/137,181

(22) PCT Filed: Dec. 5, 2023

(86) PCT No.: PCT/JP2023/043542
§ 371 (c)(1),
(2) Date: Jun. 9, 2025

(87) PCT Pub. No.: WO2024/128078
PCT Pub. Date: Jun. 20, 2024

(65) Prior Publication Data
US 2026/0012375 A1    Jan. 8, 2026

(30) Foreign Application Priority Data
Dec. 13, 2022    (JP) ................................. 2022-198376

(51) Int. Cl.
*H04L 25/02*        (2006.01)
*H04L 5/00*         (2006.01)
*H04L 27/26*        (2006.01)

(52) U.S. Cl.
CPC ........ *H04L 25/0202* (2013.01); *H04L 5/0044* (2013.01); *H04L 27/261* (2013.01); *H04L 27/2656* (2013.01)

(58) Field of Classification Search
CPC . H04L 25/0202; H04L 5/0044; H04L 27/261; H04L 27/2656
(Continued)

(56) References Cited

U.S. PATENT DOCUMENTS 9,444,526 B2     9/2016  Hoymann et al.
2010/0106828 A1*  4/2010  Palanki ................. H04L 5/0035
                                             709/224
(Continued)

FOREIGN PATENT DOCUMENTS

JP        2010-206457 A       9/2010

OTHER PUBLICATIONS

International Search Report and Written Opinion, Dated Feb. 13, 2024.
(Continued)

*Primary Examiner* — Emmanuel Bayard
(74) *Attorney, Agent, or Firm* — Westborough IP Group, LLC

(57) ABSTRACT

A system for suppressing an interference occurring between a plurality of base stations in a mobile communication system is provided. In the present system, each of the plurality of the base stations comprises an antenna section, a transmitter, a first receiver that processes a reception signal received by the antenna section, one or two or more second receivers that process reception signals received by the antenna sections of one or two or more surrounding base stations and transferred via a signal transportation means, and an estimation section that estimates information of propagation channels h between an own cell terminal and the plurality of the base stations, based on a reception result of a base-station specific signal (for example, a pilot signal) received by the first receiver from an own cell terminal and a reception result of the base-station specific signal received by the second receiver from the own cell terminal.

20 Claims, 12 Drawing Sheets

(58) Field of Classification Search
USPC .................................. 375/219–220, 260, 299
See application file for complete search history.

(56) References Cited

U.S. PATENT DOCUMENTS

| | | | |
|---|---|---|---|
| 2012/0114050 A1 | 5/2012 | Osterling | |
| 2012/0142345 A1 | 6/2012 | Choi et al. | |
| 2012/0213148 A1* | 8/2012 | Saito ..................... | H04L 5/0023 |
| | | | 370/315 |
| 2013/0331110 A1* | 12/2013 | Jia ......................... | H04L 5/0069 |
| | | | 455/450 |
| 2014/0011493 A1* | 1/2014 | Toh ...................... | H04B 7/0404 |
| | | | 455/422.1 |
| 2015/0333808 A1* | 11/2015 | Onodera .............. | H04B 7/0456 |
| | | | 370/329 |
| 2019/0089453 A1* | 3/2019 | Shiobara ............... | H04L 5/0091 |
| 2020/0343947 A1* | 10/2020 | Petersson ........... | H04W 52/365 |
| 2021/0142345 A1 | 5/2021 | Evans et al. | |
| 2021/0184908 A1 | 6/2021 | Zarifi et al. | |
| 2022/0329981 A1* | 10/2022 | Xiao ..................... | G01S 5/0205 |

OTHER PUBLICATIONS

Maeda, et al., "A Study on Uplink Communication Capacity Improvement by Base Station Cooperative Virtualized Cell Configuration MU-MIMO Canceller with Adaptive Beamforming", IEICE Technical Report, The Institute of Electronics, Information and Communication Engineers, Nov. 3, 2021, vol. 121, No. 234, pp. 46-51.
Yasui, et al., "Nonlinear Inter Cluster Interference Cancellation for Base Station Cooperation Cellular Networks with Shared RRH", IEICE Technical Report, The Institute of Electronics, Information and Communication Engineers, Jul. 10, 2013, vol. 113, No. 130, pp. 19-24.
Notice of Reasons for Refusal, Dated Feb. 1, 2024.
Decision to Grant a Patent, Dated Jul. 2, 2024.
International Preliminary Report on Patentability dated Jun. 12, 2025, for PCT Application No. PCT/JP2023/043542.
European Search Report dated Mar. 13, 2026.

* cited by examiner

SYSTEM FOR PERFORMING PROPAGATION CHANNEL ESTIMATION BY COOPERATION BETWEEN BASE STATIONS

TECHNICAL FIELD

The present invention relates to a system for performing a propagation channel estimation by a cooperation between base stations.

BACKGROUND ART

Non-Patent Literature 1 describes an interference suppression technology, in which a virtual cell is configured by a cooperation of base stations adjacent to each other and an adaptive beamforming with a Massive MIMO antenna is applied to a virtualized-cell MU-MIMO canceller that suppresses an adjacent cell interference, as a downlink interference suppression technology for an area near a cell boundary, in a mobile communication system. This literature also describes an interference suppression effect when the foregoing interference suppression technology is applied to an uplink line.

CITATION LIST

Non-Patent Literature

Non-Patent Literature 1: Ryohei Maeda and Teruya Fujii, "A Study on Uplink Communication Capacity Improvement by Base Station Cooperative Virtualized Cell Configuration MU-MIMO Canceller with Adaptive Beamforming", IEICE Technical Report, The Institute of Electronics, Information and Communication Engineers, Nov. 3, 2021, Volume 121, Number 234, pp. 46-51

SUMMARY OF INVENTION

Technical Problem

In order to build such a system, it is necessary to obtain information of propagation channel between each of base stations and each of terminals, however it is difficult to practically obtain this kind of information.

Solution to Problem

A system according to an aspect of the present invention is a system comprising a plurality of base stations that perform radio communications with a terminal. This system comprises a signal transportation means for transporting a reception signal received by an antenna section of the base station, between the plurality of the base stations, and a base-station cooperative network for transporting information of propagation channels between the terminal and the plurality of the base stations. Each of the plurality of the base stations comprises an antenna section, a transmitter that performs a process of transmitting a transmission signal from the antenna section, a first receiver that processes a reception signal received by the antenna section, one or two or more second receivers that process reception signals received by an antenna section of each of one or two or more surrounding base stations and transferred via the signal transportation means, and an estimation section that estimates information of propagation channels between an own cell terminal and the plurality of the base stations, based on a reception result of a base-station specific signal (for example, a pilot signal) received by the first receiver from an own cell terminal and a reception result of base-station specific signals (for example, the pilot signals) received by the one or two or more second receivers from the own cell terminal.

In the foregoing system, the base-station cooperative network may comprise a cooperative control apparatus that aggregates the information of propagation channels transferred respectively from the plurality of the base stations.

The foregoing system may comprise a centralized-base station configuration section in which the transmitter, the first receiver, the one or two or more second receivers and the estimation section of each of the plurality of the base stations are centrally disposed at a position away from the antenna section of each of the plurality of the base stations.

In the foregoing system, the centralized-base station configuration section may comprise, for each of the plurality of the base stations, a control apparatus that aggregates the information of propagation channels transferred respectively from the plurality of the base stations.

In the foregoing system, the base-station cooperative network may include a cooperative control apparatus that aggregates the information of propagation channels transferred respectively from the plurality of the base stations.

In the foregoing system, the base-station specific signal may be a sounding reference signal (SRS).

In the foregoing system, a downlink communication signal and an uplink communication signal may be multiplexed using a time division duplex (TDD) method, and the information of propagation channel estimated using an uplink pilot signal may be used as information of propagation channel of a downlink in the TDD. It is noted that, a reception-interference suppression weight, which is derived based on the information of propagation channel estimated using the uplink pilot signal, may be applied to the transmission signal transmitted on the downlink.

In the foregoing system, an interference suppression section may be included, which performs an interference suppression processing on at least one of the reception signal received by the base station and the transmission signal transmitted by the base station, based on the information of propagation channels of uplink and downlink which is transferred respectively from the plurality of the base stations.

Advantageous Effects of Invention

According to the present invention, it is possible to easily obtain the information of propagation channels between each base station and each terminal.

DESCRIPTION OF EMBODIMENTS

Hereinafter, embodiments of the present invention are described with reference to the drawings.

A system according to an embodiment described in the present specification is a system capable of obtaining information of propagation channel between each terminal and each base station in radio communications between base stations and terminals of a mobile communication system such as the fifth generation or the like. By obtaining the information of propagation channel between each terminal and each base station, it is possible to improve a communication quality between each terminal and each base station by a transmission/reception-signal processing such as an interference suppression or the like.

For example, it is possible to improve the communication quality by suppressing (hereinafter also referred to as "canceling") interferences that may occur when base stations close to each other (base stations forming adjacent cells or overlapping cells) use the same frequency band for each other (for example, the C band within 1 GHz to 6 GHz). The interference referred to herein is at least one of an uplink interference, in which a signal (interfering signal) transmitted from a terminal in a cell of a certain base station is received by another base station and causes an interference in the foregoing another base station, and an downlink interference, in which a signal (interfering signal) transmitted from a certain base station is received by a terminal in a cell of another base station and causes an interference in the foregoing terminal.

It is noted that in the following description, it is described of an uplink interference and a downlink interference that may occur in a communication line between a base station (for example, gNodeB) of the fifth-generation mobile communication system (hereinafter referred to as "5G system") and a terminal. However, when the present invention is used to suppress an interference, if the interference may be caused by a plurality of base stations that use the same frequency band for each other, the present invention can also be applied to an interference in mobile communication systems such as the LTE (Long Term Evolution)/LTE-Advanced mobile communication systems and the next-generation mobile communication systems later than the fifth generation (also referred to as "NR systems"), etc.

Figure 1:
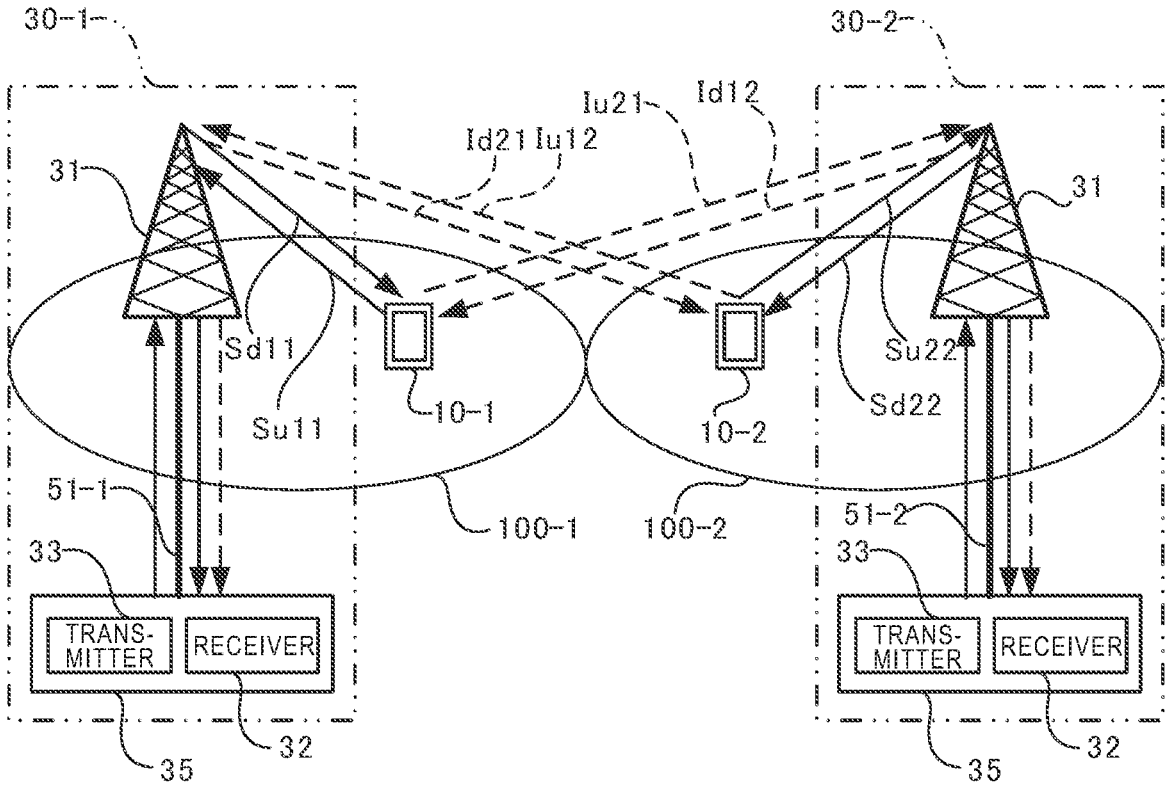
FIG. 1 is an illustration for explaining interferences that may occur in a mobile communication system according to an embodiment.

FIG. 1 is an illustration for explaining interferences that may occur in the mobile communication system according to the present embodiment. Herein, for simplicity of explanation, it is described of an example of two base stations 30-1 and 30-2 respectively forming two cells close to each other.

Each of the base stations 30-1 and 30-2 forms each of cells (own cells) 100-1 and 100-2, and can wirelessly communicate with each of terminals (also called "terminal apparatus", "user equipment (UE)", "mobile station", etc.) 10-1 and 10-2 in its own cell via an antenna section 31. The frequency bands respectively allocated to the base stations 30-1 and 30-2 is the same frequency band (for example, the C band within the range of 1 GHz to 6 GHz).

In the two base stations 30-1 and 30-2 shown in FIG. 1, a MIMO (Multi Input Multi Output) transmission method using plural antennas is used for communications respectively between the base station and each of the terminals 10-1 and 10-2, thereby improving a throughput and a communication quality during the communication with each of the terminals 10-1 and 10-2.

Although each of the two base stations 30-1 and 30-2 configuring the mobile communication system in the present embodiment adopts a configuration in which the transceiver 35 is located away from the antenna section 31, the system may adopt a configuration in which the transceiver 35 is located in substantially the same location as the antenna section 31. Each of the base stations 30-1 and 30-2 in the configuration of the present embodiment is also called a remote-type base station. The antenna section 31 (remote radio section) disposed away from the transceiver 35 may be provided with an antenna for transmitting and receiving radio waves, as well as a radio apparatus having a radio wave modulation/demodulation function, a signal amplifier, and the like. In each of the base stations 30-1 and 30-2, the antenna section 31 and the transceiver 35 is connected between each other, for example, by transportation cables 51-1 and 51-2 as signal transportation means which are wired lines such as optical fiber cables, etc.

The radio wave of the reception signal (uplink communication signal) Su11 transmitted from the terminal 10-1 in the cell 100-1 of the first base station 30-1 and received by the antenna section 31 of the first base station 30-1 may reach the antenna section 31 of the second base station 30-2 and may be received as an interference signal (uplink interference signal) Iu21.

In addition, the radio wave of the transmission signal (downlink communication signal) Sd11 transmitted from the transmitter 33 of the first base station 30-1 via the antenna section 31 may reach the terminal 10-2 in the cell 100-2 of the second base station 30-2 and may be received as an interference signal (downlink interference signal) Id21.

Similarly, the radio wave of the transmission signal Sd22 transmitted from the antenna section 31 of the second base station 30-2 may reach the terminal 10-1 in the cell 100-1 of the first base station 30-1 and may be received as an interference signal Id12.

In addition, the radio wave of the reception signal Su22 transmitted from the terminal 10-2 in the cell 100-2 of the second base station 30-2 and received by the antenna section 31 of the second base station 30-2 may reach the antenna section 31 of the first base station 30-1 and may be received as an interference signal Iu12.

Figure 2:
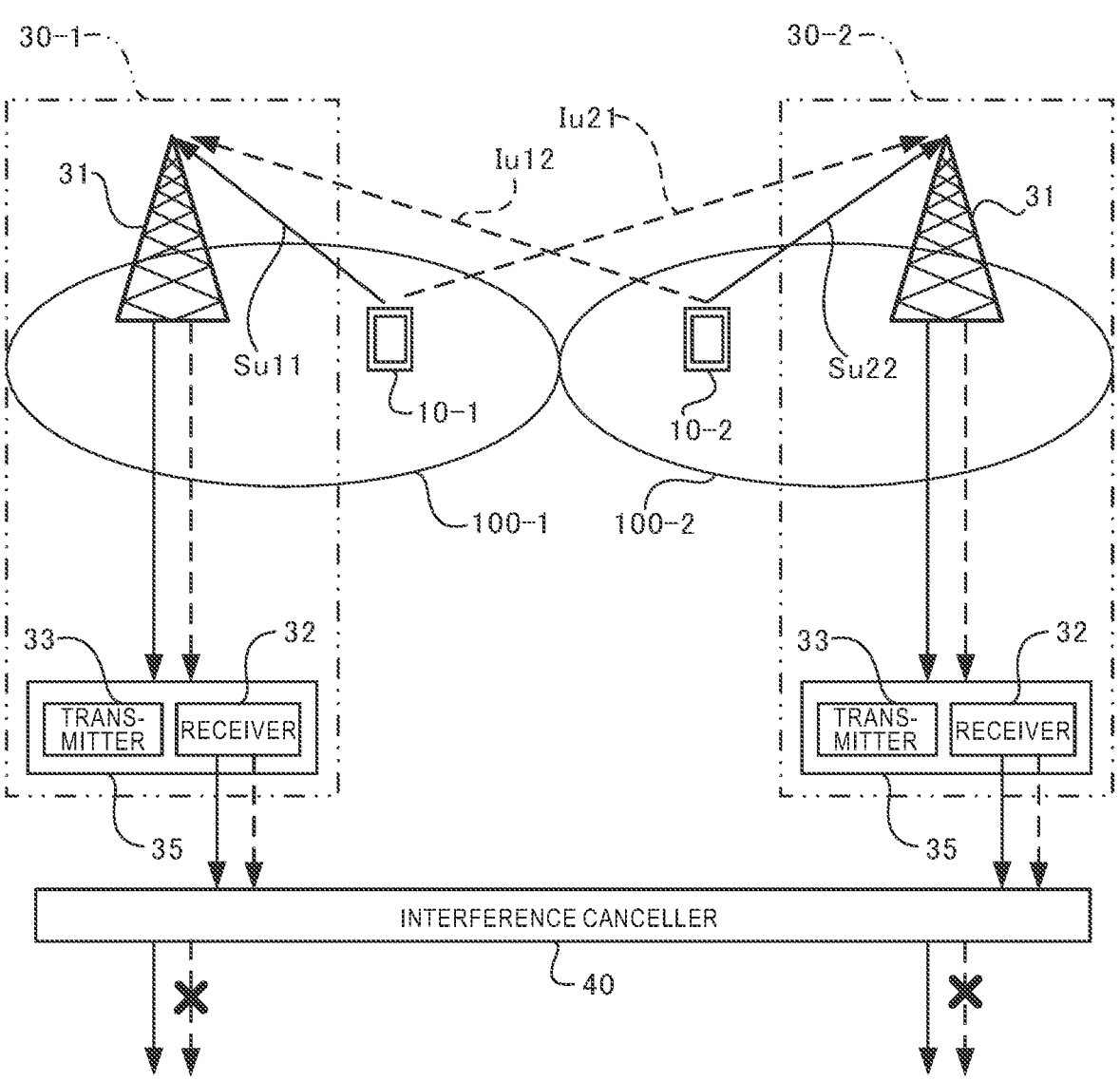
FIG. 2 is an illustration of an interference canceller that suppresses uplink interferences.

FIG. 2 is an illustration of an interference canceller that suppresses the uplink interference signals Iu12 and Iu21.

The mobile communication system of the present embodiment is provided with an interference canceller (for example, a MU-MIMO canceller) 40 as an interference suppression section that suppresses uplink interference signals Iu12 and Iu21 received by the two base stations 30-1 and 30-2.

By using the interference canceller 40, the uplink interference signal Iu12 from the other cell terminal 10-2 is suppressed from the reception signal received by the receiver 32 incorporated in the transceiver 35 of the first base station 30-1, and the reception signal Su11 from the terminal (own cell terminal) 10-1 in the cell (own cell) 100-1 of the first base station 30-1 is obtained. Therefore, this solves a problem such as a degradation of uplink communication quality caused by the interference due to the uplink interference signal Iu12 from the other cell terminal 10-2.

It is noted that, since the same applies to the case of suppressing the uplink interference signal Iu21 that is transmitted from the terminal (other cell terminal) 10-1 in the cell 100-1 of the first base station 30-1 and reaches the antenna section 31 of the second base station 30-2, the description thereof is omitted.

Figure 3:
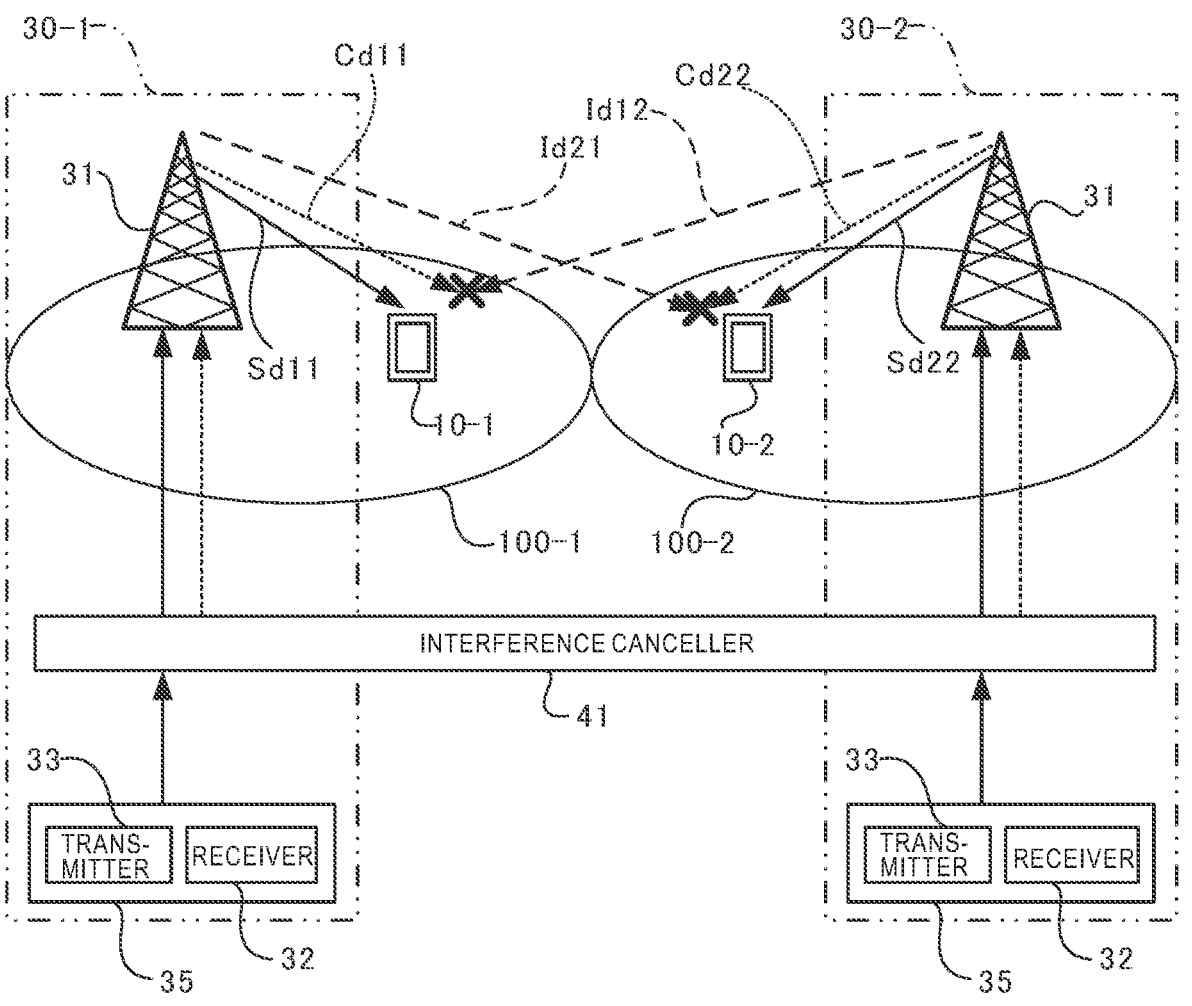
FIG. 3 is an illustration of an interference canceller that suppresses downlink interferences.

FIG. 3 is an illustration of an interference canceller that suppresses the downlink interference signals Id12 and Id21.

The mobile communication system of the present embodiment is provided with an interference canceller 41 as an interference suppression section that suppresses the downlink interference signals Id12 and Id21 transmitted from the two base stations 30-1 and 30-2.

By using the interference canceller 41, the own cell terminal 10-1 of the first base station 30-1 can receive the transmission signal Sd11 transmitted from the antenna section 31 of the first base station 30-1 in a state in which the downlink interference signal Id12 from the second base station 30-2 is suppressed. Therefore, this solves a problem such as a degradation of downlink communication quality caused by the interference due to the downlink interference signal Id12 from the second base station 30-2.

It is noted that, since the same applies to the case of suppressing the downlink interference signal Id21 that is transmitted from the antenna section 31 of the first base station 30-1 and reaches the terminal 10-2 in the cell 100-2 of the second base station 30-2, the description thereof is omitted.

Although the interference canceller 40 in the mobile communication system of the present embodiment suppresses both the uplink interference signals Iu12 and Iu21 and the downlink interference signals Id12 and Id21, the interference canceller 40 may also be a canceller of suppressing only one of the uplink interference signals Iu12 and Iu21 and the downlink interference signals Id12 and Id21.

Herein, the interference canceller 40 derives interference cancellation weights from the information of propagation channels hu11, hu12, hu21 and hu22 respectively between the base stations and the terminals, and multiplies the interference cancellation weights by the reception signals, thereby suppressing the interference. Therefore, it is necessary to obtain the information of propagation channels hu11, hu12, hu21 and hu22 for the uplink communication signals Su11 and Su22 and the uplink interference signals Iu12 and Iu21. Similarly, the interference canceller 41 derives interference cancellation weights from the information of propagation channels hd11, hd12, hd21 and hd22 respectively between the base stations and the terminals, and multiplies the interference cancellation weights by the transmission signals, thereby suppressing the interference. Therefore, it is necessary to obtain the information of propagation channels hd11, hd12, hd21 and hd22 for the downlink communication signals Sd11 and Sd22 and the downlink interference signals Id12 and Id21.

It is necessary of the information of propagation channels to apply the technology for improving the communication quality, such as the above-mentioned interference canceller, etc.

In the mobile communication system in the present embodiment, since a TDD (Time Division Duplex) transmission method is used, and therefore a two-way communication is performed by switching the same frequency band between the uplink and downlink in an extremely short time. Therefore, for example, the uplink interference signal Iu21 and the downlink interference signal Id12 transmitted and received between the terminal 10-1 in the cell 100-1 of the first base station 30-1 and the antenna section 31 of the second base station 30-2 are both communicated through the same propagation channel, and therefore the same information of propagation channels can be used for these uplink interference signal Iu21 and downlink interference signal Id12.

Therefore, in the present embodiment, for example, by obtaining the information of propagation channels hu11 and hu22 of the uplink communication signals Su11 and Su22 as uplink communication signals, and the information of propagation channels hu12 and hu21 of the uplink interference signals Iu12 and Iu21 as uplink interference signals, the same information of these propagation channels can be used as the information of propagation channels hd11 and hd22 of the downlink communication signals Sd11 and Sd22 that are downlink communication signals, and can be used as the information of propagation channels hd21 and hd12 of the downlink interference signals Id12 and Id21 that are downlink interference signals. Hereinafter, the information of propagation channel for each propagation channel is described as the information of propagation channels h11, h12, h21 and h22 of the uplink.

The information of propagation channel can be expressed by an amplitude and a phase. For example, the information of propagation channel h11 can be expressed as $h11=|h11|\times e^{j\theta11}$ using the amplitude $|h11|$ and the phase $\theta11$. Such information of propagation channel (uplink) can be obtained from a pilot signal (for example, Sounding Reference Signal (SRS)) transmitted from each of the terminals 10-1 and 10-2 and received by the antenna sections 31 of each of the base stations 30-1 and 30-2.

However, a conventional base station generally does not include a configuration for identifying and receiving signals from other cell terminal, from reception signals received by the antenna section 31 of the own station. Therefore, although it is possible to obtain the information of propagation channels h11 and h22 of pilot signals (uplink communication signals Su11 and Su22) transmitted from the own cell terminal, it is not possible to obtain the information of propagation channels h12 and h21 of pilot signals (uplink interference signals Iu12 and Iu21) transmitted from other cell terminals.

Figure 4:
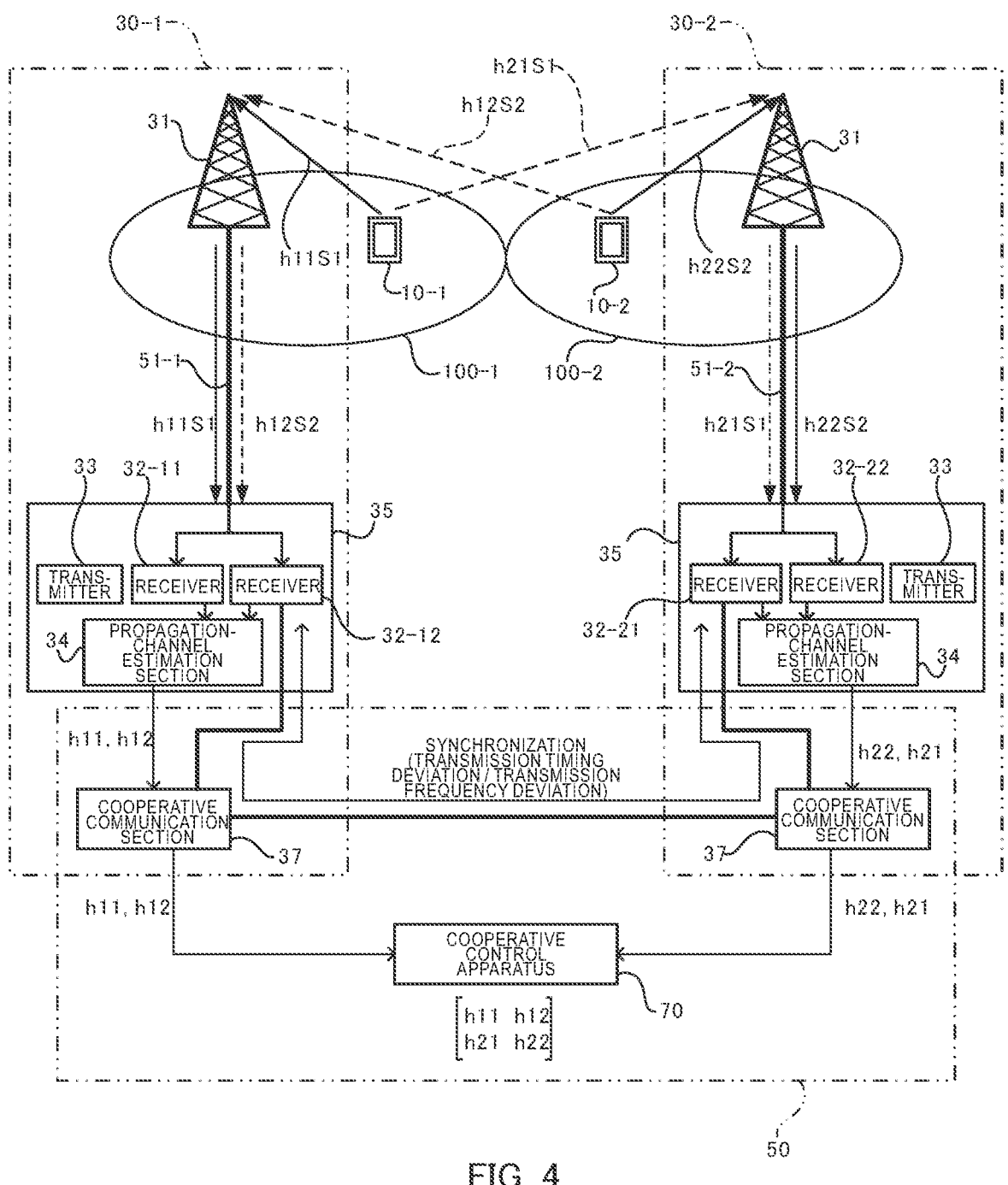
FIG. 4 is an illustration showing an example of a method for obtaining information of propagation channel of a pilot signal transmitted from a terminal of another cell.

FIG. 4 is an illustration showing an example of a method for obtaining the information of propagation channels h11, h12, h21 and h22 of the pilot signals transmitted from the other cell terminals 10-2 and 10-1.

The example in FIG. 4 is a configuration in which the transceiver 35 of each of the base stations 30-1 and 30-2 is further equipped with receivers 32-11 and 32-22 that receive the reception signals (uplink communication signals) Su11 and Su22 from each of the own cell terminals 10-1 and 10-2, as well as receivers 32-12 and 32-21 that receive the uplink interference signals Iu12 and Iu21 from the other cell terminals 10-2 and 10-1 which are received by the antenna section 31 of the own station. By adding such receivers 32-12 and 32-21 to each of the base stations 30-1 and 30-2, it is possible to identify and receive the signals (uplink interference signals Iu12 and Iu21) from the other cell terminals 10-2 and 10-1, from the reception signal received by the antenna section 31 of each of the base station 30-1 and 30-2.

It is noted that in the following description, the uplink communication signal Su11 received by the first base station 30-1 is expressed as "h11S1" using the information of propagation channel h11 of this signal and the communication information S1 of this signal, and the uplink interference signal Iu12 received by the first base station 30-1 is expressed as "h12S2" using the information of propagation channel h12 of this signal and the communication information S2 of this signal, as appropriate. Similarly, the uplink communication signal Su22 received by the second base station 30-2 is expressed as "h22S2" using the information of propagation channel h22 of this signal and the communication information S2 of this signal, and the uplink interference signal Iu21 received by the second base station 30-2 is expressed as "h21S1" using the information of propagation channel h21 of this signal and the communication information S1 of this signal.

According to the example in FIG. 4, in the first base station 30-1, the receiver 32-11 identifies and receives the pilot signal h11S1 (uplink communication signal Iu11) from the own cell terminal 10-1. In this case, the propagation-channel estimation section 34 of the first base station 30-1 calculates the information of propagation channel h11 relating to the propagation channel from the own cell terminal 10-1 to the antenna section 31 of the first base station 30-1, from the received pilot signal h11S1. Similarly, in the second base station 30-2, the receiver 32-22 identifies and receives the pilot signal h22S2 (uplink interference signal Iu22) from the own cell terminal 10-2. In this case, the propagation-channel estimation section 34 of the second base station 30-2 calculates the information of propagation channel h22 relating to the propagation channel from the own cell terminal 10-2 to the antenna section 31 of the second base station 30-2, from the received pilot signal h22S2.

According to the example in FIG. 4, in the first base station 30-1, the receiver 32-12 identifies and receives the pilot signal h12S2 (uplink interference signal Iu12) from the other cell terminal 10-2. In this case, the propagation-channel estimation section 34 of the first base station 30-1 can calculate the information of propagation channel h12 relating to the propagation channel from the other cell terminal 10-2 to the antenna section 31 of the first base station 30-1, from the received pilot signal h12S2. Similarly, in the second base station 30-2, the receiver 32-21 identifies and receives the pilot signal h21S1 (uplink interference signal Iu21) from the other cell terminal 10-1. In this case, the propagation-channel estimation section 34 of the second base station 30-2 can calculate the information of propagation channel h21 relating to the propagation channel from the other cell terminal 10-1 to the antenna section 31 of the second base station 30-2, from the received pilot signal h21S1.

In the propagation-channel estimation section 34 of each of the base stations 30-1 and 30-2, in order to properly calculate the information of propagation channel from the pilot signal, it is necessary to grasp a transmission timing deviation and a transmission frequency deviation of the pilot signal. The transmission timing deviation and the transmission frequency deviation of the pilot signal are grasped by the transceiver 35 of the base station to which the terminal transmitting the pilot signal is connected.

Therefore, among the plural pieces of information of propagation channels, the information of propagation channels h11 and h22 of the pilot signals h11S1 and h22S2 transmitted from the own-cell terminals 10-1 and 10-2 can be obtained by the propagation-channel estimation section 34 of each of the base stations 30-1 and 30-2. That is, the information of propagation channel h11 of the pilot signal h11S1 transmitted from the terminal 10-1 connected to the first base station 30-1 can be obtained by the propagation-channel estimation section 34 of the first base station 30-1 using the transmission timing deviation and the transmission frequency deviation which are grasped by its own transceiver 35. Similarly, the information of propagation channel h22 of the pilot signal h22S2 transmitted from the terminal 10-2 connected to the second base station 30-2 can be obtained by the propagation-channel estimation section 34 of the second base station 30-2 using the transmission timing deviation and the transmission frequency deviation which are grasped by its own transceiver 35.

However, the transceivers 35 of the base stations 30-1 and 30-2, which respectively receives the pilot signals h12S2 and h21S1 transmitted from the other cell terminals 10-2 and 10-1, does not grasp the transmission timing deviation and the transmission frequency deviation of the pilot signals. Therefore, in order to obtain the information of propagation channels h12 and h21 of the pilot signals h12S2 and h21S1 transmitted from the other cell terminals 10-2 and 10-1, it is necessary to perform a process for grasping the transmission timing deviation and the transmission frequency deviation of the pilot signals.

However, it is generally extremely difficult for the receivers installed in other base stations to grasp the transmission timing deviation and the transmission frequency deviation of the other cell terminals in real time, since the base stations have to transfer these pieces of information to each other.

In order to realize this process, in the example of FIG. 4, a cooperative communication section 37 is installed in each of the base stations 30-1 and 30-2, and a base-station cooperative network 50 is used, in which the base stations 30-1 and 30-2 are connected by wired lines such as optical fiber cables so that they can communicate with each other. In the first base station 30-1, the receiver 32-12 of receiving the pilot signal h12S2 transmitted from the other cell terminal 10-2 can perform a synchronization process with the receiver 32-22 of the second base station 30-2 that receives the pilot signal h22S2 transmitted from the other cell terminal 10-2 by a synchronous communication with the second base station 30-2 via the base-station cooperative network 50. By performing this synchronization process, the first base station 30-1 can grasp the transmission timing deviation and the transmission frequency deviation of the pilot signal h12S2 transmitted from the other cell terminal 10-2 and received by the receiver 32-12, and can obtain the information of propagation channel h12 of the pilot signal h12S2.

In the second base station 30-2, the receiver 32-21 of receiving the pilot signal h21S1 transmitted from the other cell terminal 10-1 can perform a synchronization process with the receiver 32-11 of the first base station 30-1 that receives the pilot signal h11S1 transmitted from the other cell terminal 10-1 by a synchronous communication with the first base station 30-1 via the base-station cooperative network 50. By performing this synchronization process, the second base station 30-2 can grasp the transmission timing deviation and the transmission frequency deviation of the pilot signal h21S1 transmitted from the other cell terminal 10-1 and received by the receiver 32-21, and can obtain the information of propagation channel h21 of the pilot signal h21S1.

In the example of FIG. 4, a cooperative control apparatus 70 is provided in the base-station cooperative network 50, and the information of propagation channels h11 and h12 obtained by the first base station 30-1 and the information of propagation channels h21 and h22 obtained by the second base station 30-2 are transferred to the cooperative control apparatus 70. As a result, the cooperative control apparatus 70 can obtain all of the information of propagation channels h11, h12, h21 and h22.

However, in order to perform the above-mentioned synchronization process, a synchronous communication with little time lag is required between the base stations 30-1 and 30-2, and a high-load process is required at the base stations 30-1 and 30-2, therefore, it difficult to realize the synchronization process. Furthermore, it is also difficult to grasp the transmission timing deviation and the transmission frequency deviation of the pilot signals h12S2 and h21S1 from the other cell terminals 10-2 and 10-1 which are respectively received by the receivers 32-12 and 32-21 in the base stations 30-1 and 30-2, by using a method other than the foregoing synchronization process.

Embodiment 1

Figure 5:
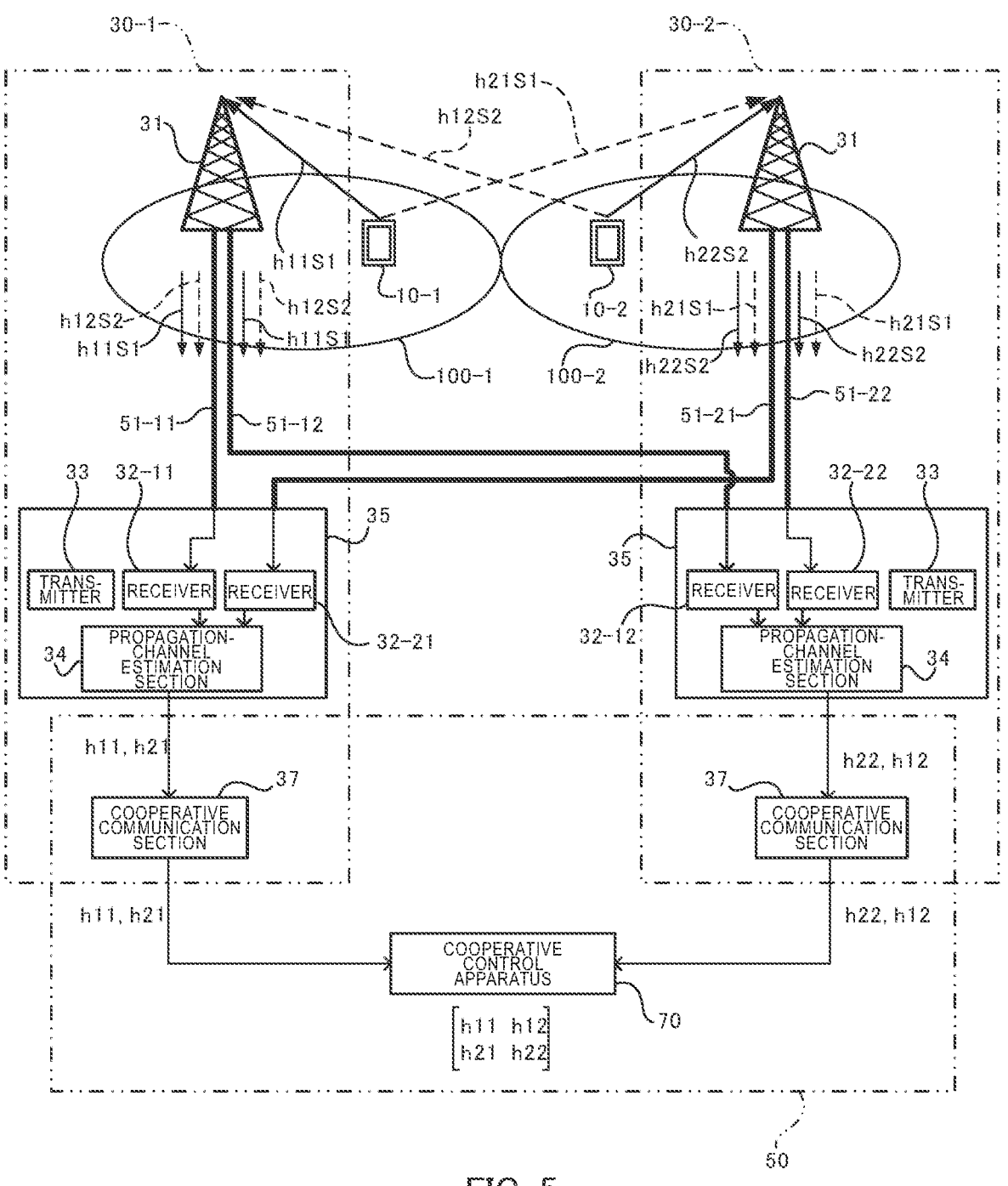
FIG. 5 is an illustration showing a method for obtaining information of propagation channel in a mobile communication system according to the embodiment 1.

FIG. 5 is an illustration showing a method for obtaining the information of propagation channels h11, h12, h21 and h22 in a mobile communication system according to the embodiment of the present invention (hereinafter, the present embodiment is referred to as "embodiment 1").

In the present embodiment 1, as shown in FIG. 5, the transceiver 35 of each of the base stations 30-1 and 30-2 is configured to include receivers 32-11 and 32-22 as the first receivers that receive reception signals (uplink communication signals) Su11 and Su22 from each of the own cell terminals 10-1 and 10-2, as well as receivers 32-21 and 32-12 as the second receivers that receive uplink interference signals Iu21 and Iu12 from the own cell terminals 10-1 and 10-2 which are respectively received by the antenna sections 31 of the other base stations 30-2 and 30-1.

That is, in the mobile communication system of the present embodiment 1, the second receivers for receiving the pilot signals transmitted from the own cell terminal are additionally installed in the transceiver 35 of each of the base stations, the number of the second receivers corresponds to the number of surrounding base stations.

As described above, the transceiver 35 of the first base station 30-1 grasps the transmission timing deviation and the transmission frequency deviation of the uplink interference signal Iu21 transmitted from the terminal 10-1 of the first base station 30-1 and received by the antenna section 31 of the second base station 30-2. Therefore, the propagation-channel estimation section 34 serving as an estimation section of the first base station 30-1 can estimate (generate or obtain) the information of propagation channel h21, from the uplink interference signal Iu21 received by the receiver 32-21 incorporated in its own transceiver 35, without performing the synchronization process required in the example of FIG. 4. Similarly, the transceiver 35 of the second base station 30-2 grasps the transmission timing deviation and the transmission frequency deviation of the uplink interference signal Iu12 transmitted from the terminal 10-2 of the second base station 30-2 and received by the antenna section 31 of the first base station 30-1. Therefore, the propagation-channel estimation section 34 of the second base station 30-2 can estimate the information of propagation channel h12, from the uplink interference signal Iu12 received by the receiver 32-12 incorporated in its own transceiver 35, without performing the synchronization process required in the example of FIG. 4.

According to the example of FIG. 5, in the same way as in FIG. 4, in the first base station 30-1, the receiver 32-11 identifies and receives the pilot signal h11S1 (uplink communication signal Iu11) from the own cell terminal 10-1. In this case, the propagation-channel estimation section 34 of the first base station 30-1 calculates the information of propagation channel h11 relating to the propagation channel from the own cell terminal 10-1 to the antenna section 31 of the first base station 30-1, from the received pilot signal h11S1. Similarly, in the second base station 30-2, the receiver 32-22 identifies and receives the pilot signal h22S2 (uplink interference signal Iu22) from the own cell terminal 10-2. In this case, the propagation-channel estimation section 34 of the second base station 30-2 calculates the information of propagation channel h22 relating to the propagation channel from the own cell terminal 10-2 to the antenna section 31 of the second base station 30-2, from the received pilot signal h22S2.

Therefore, in the present embodiment 1, the propagation-channel estimation section 34 of the first base station 30-1 can estimate the information of propagation channels h11 and h21, and the propagation-channel estimation section 34 of the second base station 30-2 can estimate the information of propagation channels h22 and h12. Therefore, by transferring the information of propagation channels estimated by the propagation-channel estimation section 34 of each of the base stations 30-1 and 30-2, to the cooperative control apparatus 70 via the base-station cooperative network 50, all of the information of propagation channels h11, h12, h21 and h22 can be obtained in the cooperative control apparatus 70.

As described above, according to the present embodiment 1, when the cooperative control apparatus 70 obtains all of the information of propagation channels h11, h12, h21 and h22, it is not necessary to perform a synchronization process for the transmission timing deviation and the transmission frequency deviation, etc., which is necessary in the example of FIG. 4.

Figure 6:
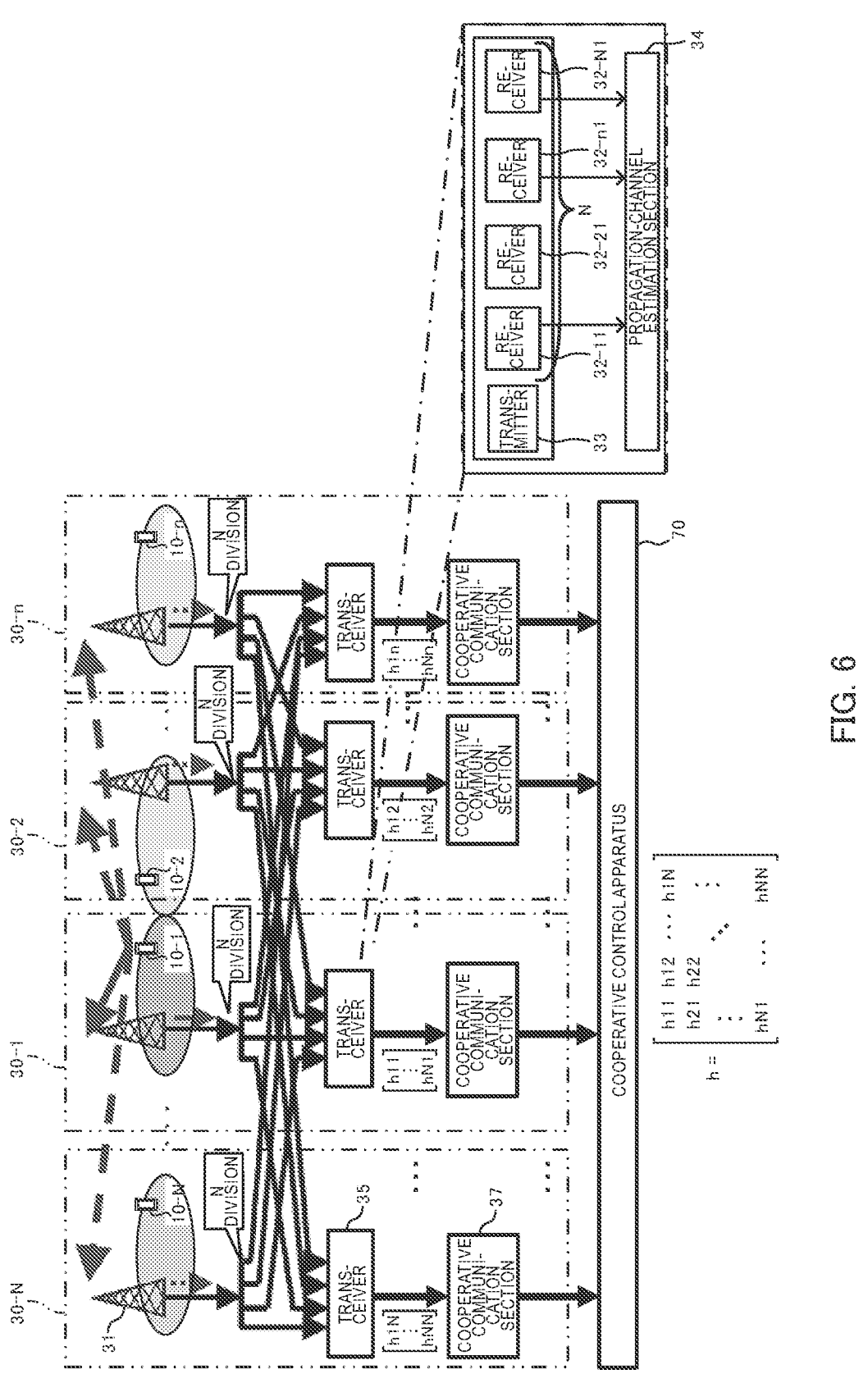
FIG. 6 is an illustration showing an example of obtaining all of the information of propagation channels between N base stations in the embodiment 1.

FIG. 6 is an illustration showing an example of obtaining all of the information of propagation channels h11, h12, . . . , h1N, . . . , hN1, hN2, . . . , hNN between N base stations 30-1, 30-2, . . . , 30-N in the present embodiment 1.

According to the present embodiment 1, as shown in FIG. 6, the transceiver 35 of each of the base stations 30-1, 30-2, . . . , 30-N is provided with receivers 32-11, 32-22, . . . , 32-NN as the first receivers that receive reception signals from each of the own cell terminals 10-1, 10-2, 10-NN, as well as receivers 32-21, . . . , 32-N1, . . . as the (N−1) second receivers that receive uplink interference signals from the own cell terminals 10-1, 10-2, 10-NN received by the antenna section 31 of another base station. Then, by transferring each of the information of propagation channels estimated by the propagation-channel estimation section 34 of each of the base stations 30-1, 30-2, . . . , 30-N, to the cooperative control apparatus 70 via the base-station cooperative network 50, the cooperative control apparatus 70 can obtain all of the information of propagation channels h11, h12, . . . , h1N, . . . , hN1, hN2, . . . , hNN.

Embodiment 2

Figure 7:
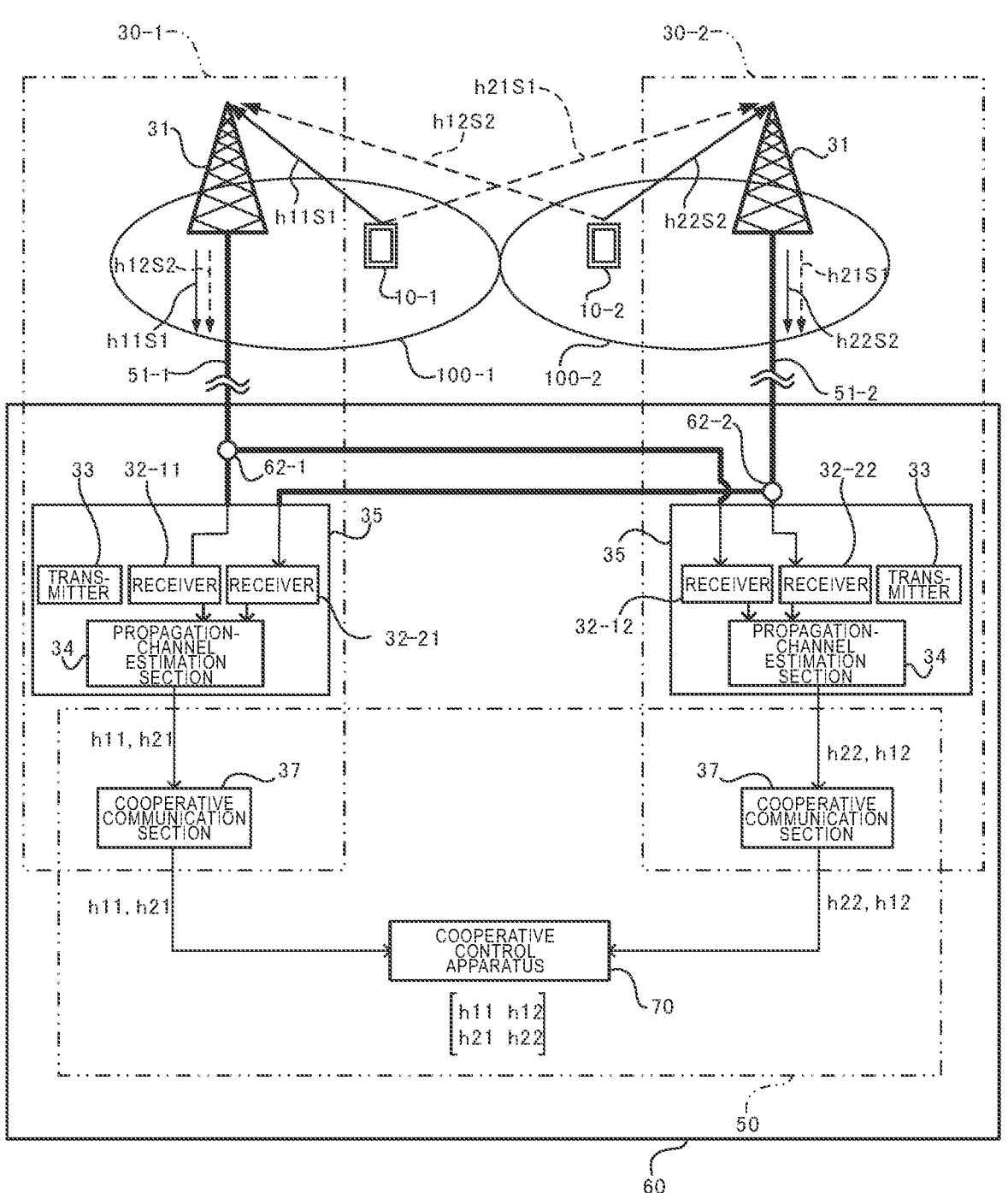
FIG. 7 is an illustration showing a method for obtaining the information of propagation channel in the mobile communication system according to the embodiment 2.

FIG. 7 is an illustration showing a method for obtaining the information of propagation channels h11, h12, h21 and h22 in a mobile communication system according to another embodiment of the present invention (hereinafter, the present embodiment is referred to as "embodiment 2").

Figure 8:
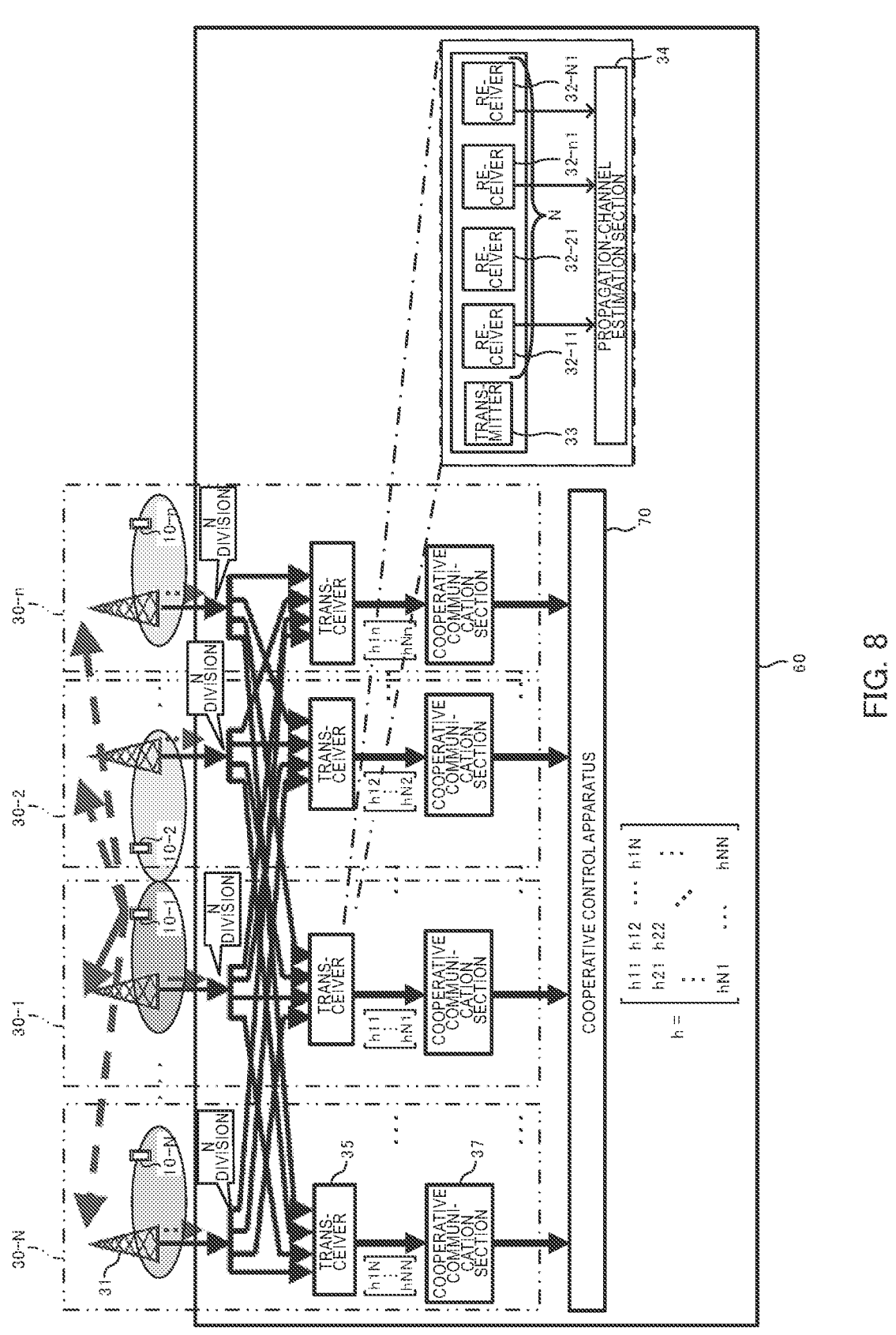
FIG. 8 is an illustration showing an example of obtaining all of the information of propagation channels between N base stations in the embodiment 2.

FIG. 8 is an illustration showing an example of obtaining all of the information of propagation channels h11, h12, . . . , h1N, . . . , hN1, hN2, . . . , hNN between N base stations 30-1, 30-2, . . . , 30-N in the present embodiment 2.

The mobile communication system in the present embodiment 2 adopts a central-base station configuration, in which the transceivers 35 of the two base stations 30-1 and 30-2 are centrally disposed in one location away from their respective antenna sections 31. Hereinafter, the location where the transceivers 35 of the two base stations 30-1 and 30-2 are centrally disposed is called a "centralized-base station configuration section 60".

In the configuration of the above-mentioned embodiment 1, the transceiver 35 of each of the base stations 30-1 and 30-2 is provided with the receivers 32-21 and 32-12 that respectively receive the uplink interference signals Iu21 and Iu12 from the own cell terminals 10-1 and 10-2 which are received by the antenna sections 31 of the other base stations 30-2 and 30-1. For this reason, it is necessary to install a transportation cable that is signal transportation means for transmitting signals from the antenna sections 31 of the other base stations 30-2 and 30-1, in the transceiver 35 of each of the base stations 30-1 and 30-2. Therefore, in the example shown in FIG. 5, in addition to the transportation cables 51-11 and 51-22 that respectively connect between the antenna sections 31 and the transceivers 35 in the own stations, transportation cables 51-21 and 51-12 are additionally installed to respectively connect between the antenna sections 31 of the other base stations 30-2 and 30-1 and the transceivers 35 of the own stations.

In a configuration having such transportation cables 51-21 and 51-12 that are additionally installed, it is necessary of a long transportation cable (such as an optical cable) having a length corresponding to the distance between the antenna sections 31 of the other base stations 30-2 and 30-1 and the transceiver 35 of the base station itself. In particular, in a configuration having the transportation cables that are laid between three or more base stations as shown in FIG. 6, it is necessary to lay a large number of long transportation cables, which increases the laying costs.

In the mobile communications system of the present embodiment 2, as shown in FIG. 7, branching sections 62-1 and 62-2 are installed in the centralized-base station configuration section 60, which respectively branch the existing transportation cables 51-1 and 51-2 for respectively connecting between the transceivers 35 of each of the base stations 30-1 and 30-2 installed in the centralized-base station configuration section 60 and the antenna sections 31.

The transportation cable 51-1 extending from the antenna section 31 of the first base station 30-1 is branched into two cables by the branching section 62-1 in the centralized-base station configuration section 60. One of the branched transportation cables is connected to the transceiver 35 of the first base station 30-1, and the other branched transportation cable is connected to the transceiver 35 of the second base station 30-2. Thereby, the reception signal received by the antenna section 31 of the first base station 30-1 is input to the transceiver 35 of the first base station 30-1 and the transceiver 35 of the second base station 30-2, respectively. As a result, the uplink communication signal h11S1 from the own cell terminal 10-1, which is included in the received reception signal, is identified and received by the receiver 32-11 in the transceiver 35 of the first base station 30-1, and the uplink interference signal h12S2 from the other cell terminal 10-2, which is included in the received reception signal, is identified and received by the receiver 32-12 in the transceiver 35 of the second base station 30-2.

Similarly, the transportation cable 51-2 extending from the antenna section 31 of the second base station 30-2 is branched into two cables by the branching section 62-2 in the centralized-base station configuration section 60. One of the branched transportation cables is connected to the transceiver 35 of the first base station 30-1, and the other branched transportation cable is connected to the transceiver 35 of the second base station 30-2. Thereby, the reception signal received by the antenna section 31 of the second base station 30-2 is input to the transceiver 35 of the first base station 30-1 and the transceiver 35 of the second base station 30-2, respectively. As a result, the uplink communication signal h22S2 from the own cell terminal 10-2, which in included in the received reception signal, is identified and received by the receiver 32-22 in the transceiver 35 of the second base station 30-2, and the uplink interference signal h21S1 from the other cell terminal 10-1, which is included in the received reception signal, is identified and received by the receiver 32-21 in the transceiver 35 of the first base station 30-1.

As described above, the mobile communication system of the present embodiment 2 has the configuration in which the existing transportation cables 51-1 and 51-2 for transmitting signals from the antenna sections 31 of the other base stations 30-2 and 30-1 to the transceiver 35 of each of the base stations 30-1 and 30-2 are respectively branched by the branching sections 62-1 and 62-2 in the centralized-base station configuration section 60. According to this configuration, compared to the configuration in which the additional transportation cables 51-21 and 51-12 are laid as in the above-mentioned embodiment 1, the laying costs can be significantly reduced.

Embodiment 3

Figure 9:
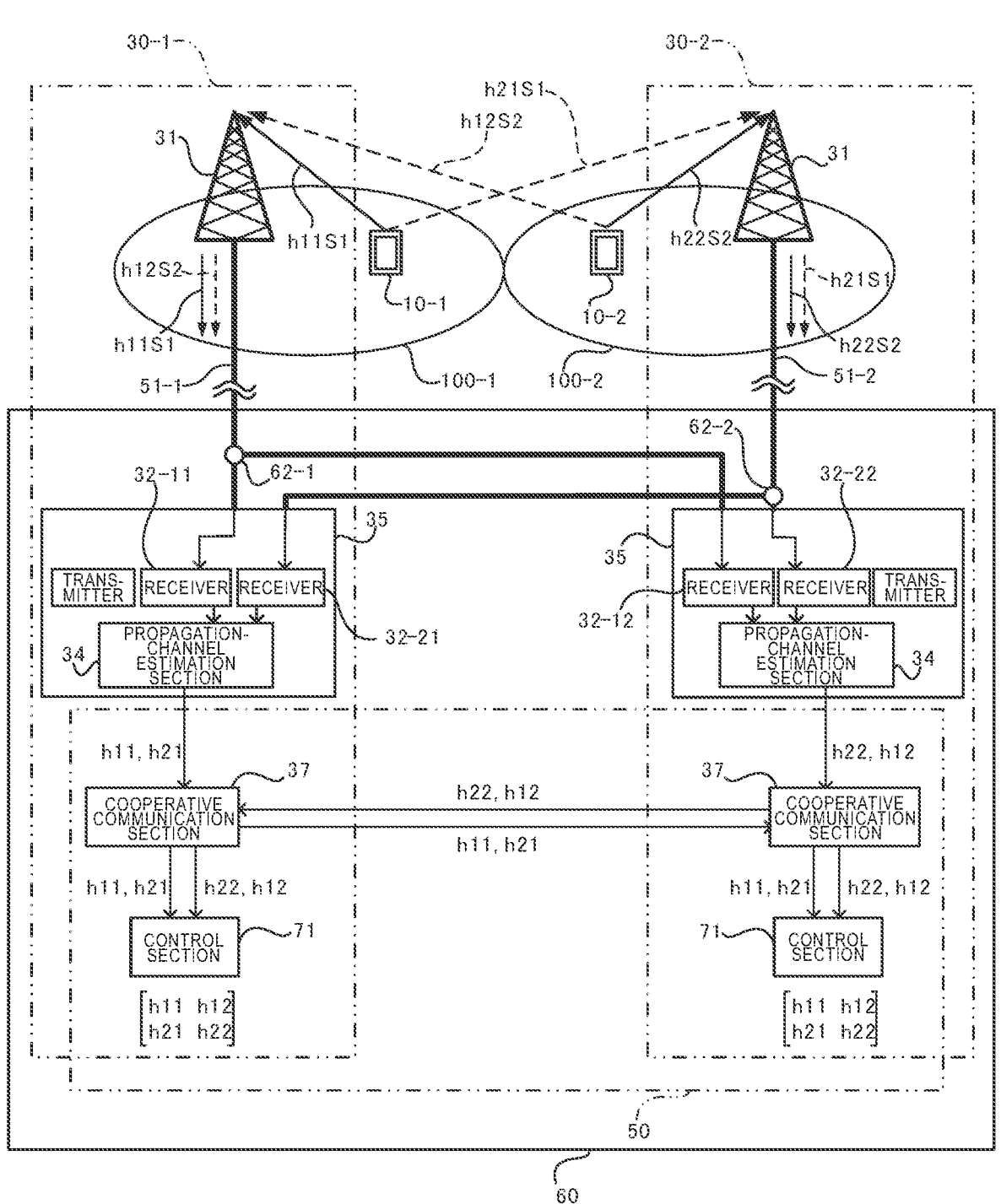
FIG. 9 is an illustration showing a method for obtaining the information of propagation channel in the mobile communication system according to the embodiment 3.

FIG. 9 is an illustration showing a method for obtaining the information of propagation channels h11, h12, h21 and h22 in a mobile communication system according to yet another embodiment of the present invention (hereinafter, the present embodiment is referred to as "embodiment 3").

Figure 10:
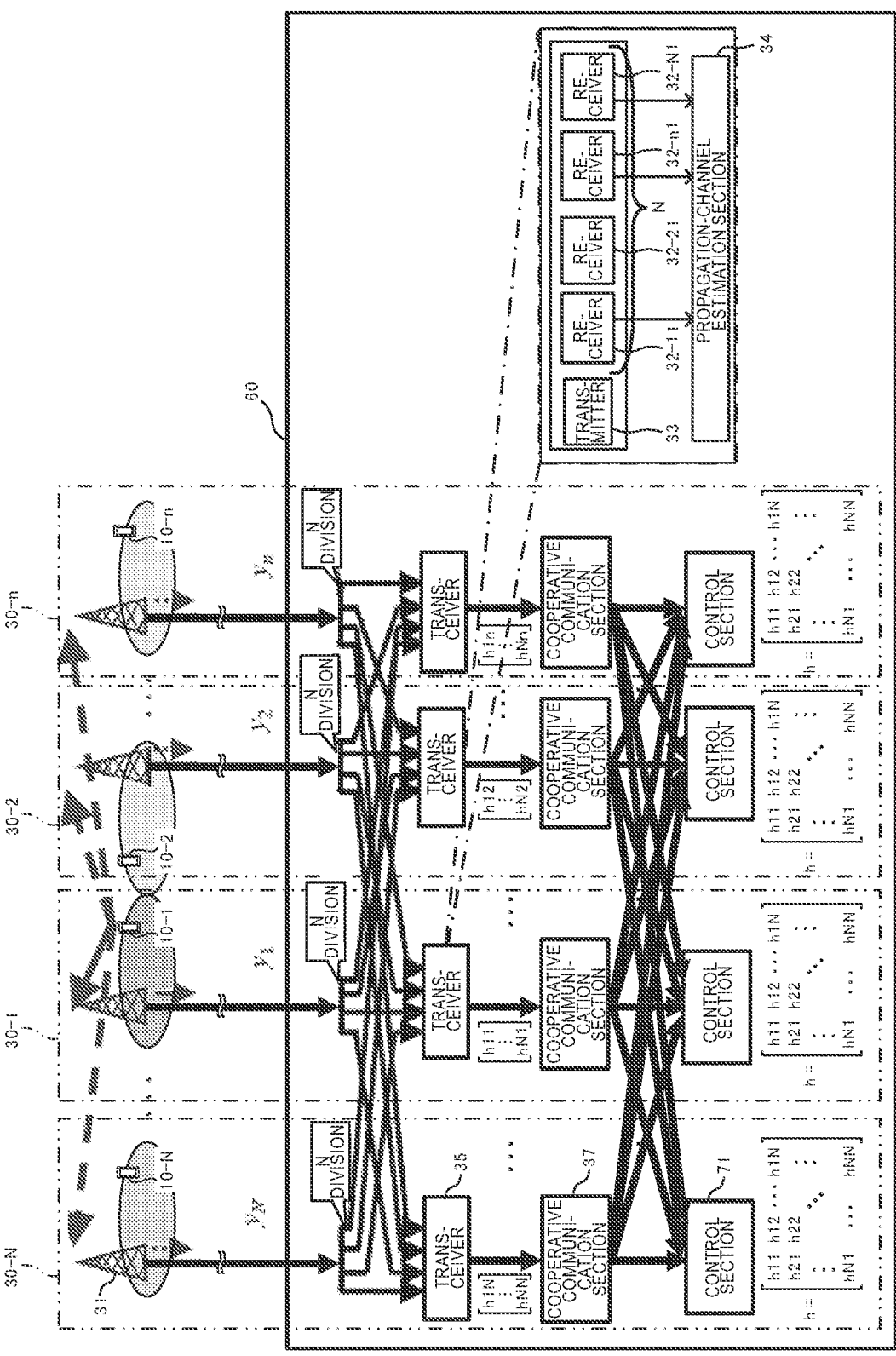
FIG. 10 is an illustration showing an example of obtaining all of the information of propagation channels between N base stations in the embodiment 3.

FIG. 10 is an illustration showing an example of obtaining all of the information of propagation channels h11, h12, . . . , h1N, . . . , hN1, hN2, . . . , hNN between N base stations 30-1, 30-2, . . . , 30-N in the present embodiment 3.

In the mobile communication system of the present embodiment 3, the configuration having the centralized-base station of the above-mentioned embodiment 2 is adopted, and the functions of the cooperative control apparatus 70 are respectively distributed to the base stations 30-1, 30-2, . . . , 30-N. For more details, instead of the configuration in which the information of propagation channels estimated by each of the base stations 30-1, 30-2, . . . , 30-N is transferred to the cooperative control apparatus 70 in the above-mentioned embodiment 2, it is adopted of a configuration in which a control apparatus 71 is placed in each of the base stations, and the base stations respectively pass the information of propagation channels information to each other in the present embodiment 3. Then, the control apparatuses 71 of the base stations respectively obtain all of the information of propagation channels h11, h12, . . . , h1N, . . . , hN1, hN2, . . . , hNN.

In the mobile communication system of the present embodiment 3, since the control apparatus 71 of each of the base stations 30-1, 30-2, . . . , 30-N is configured to obtain all of the information of propagation channels h11, h12, . . . , h1N, . . . , hN1, hN2, . . . , hNN, there is no need to separately provide the foregoing cooperative control apparatus 70 for aggregating all of the information of propagation channels information as in the above-described embodiment 2.

Figure 11:
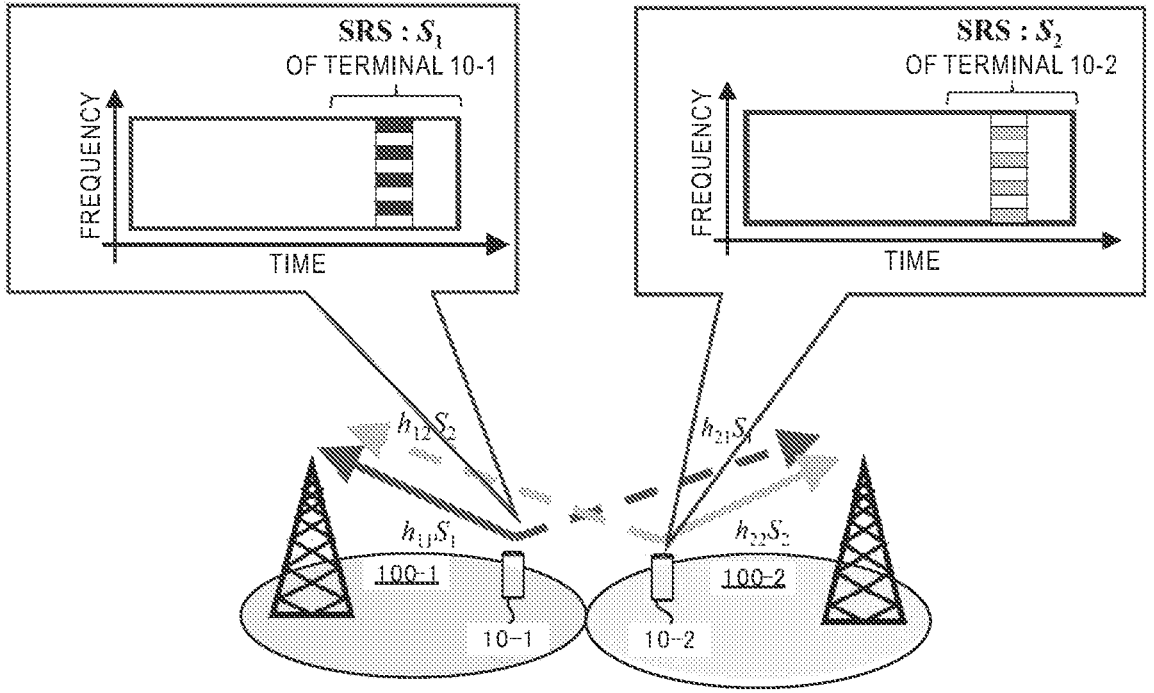
FIG. 11 is an illustration of an example in which an SRS is used as a predetermined signal for obtaining the information of propagation channels.

In the above-described embodiments, the sounding reference signal (SRS) received by the antenna section 31 of each of the base stations 30-1 and 30-2 from each of the terminals 10-1 and 10-2 is used as a pilot signal for obtaining the information of propagation channels. This SRS is adopted in the 5G standard and is an uplink reference signal for measuring the uplink channel quality and reception timing, etc. on the base stations 30-1 and 30-2 side. This SRS uses the 1st, 2nd and 4th OFDM symbols from the last 6th OFDM symbols, and the SRSs assigned to the terminals 10-1 and 10-2 corresponding to the base stations 30-1 and 30-2 are orthogonal on the frequency axis as shown in FIG. 11, so they do not interfere with each other.

Figure 12:
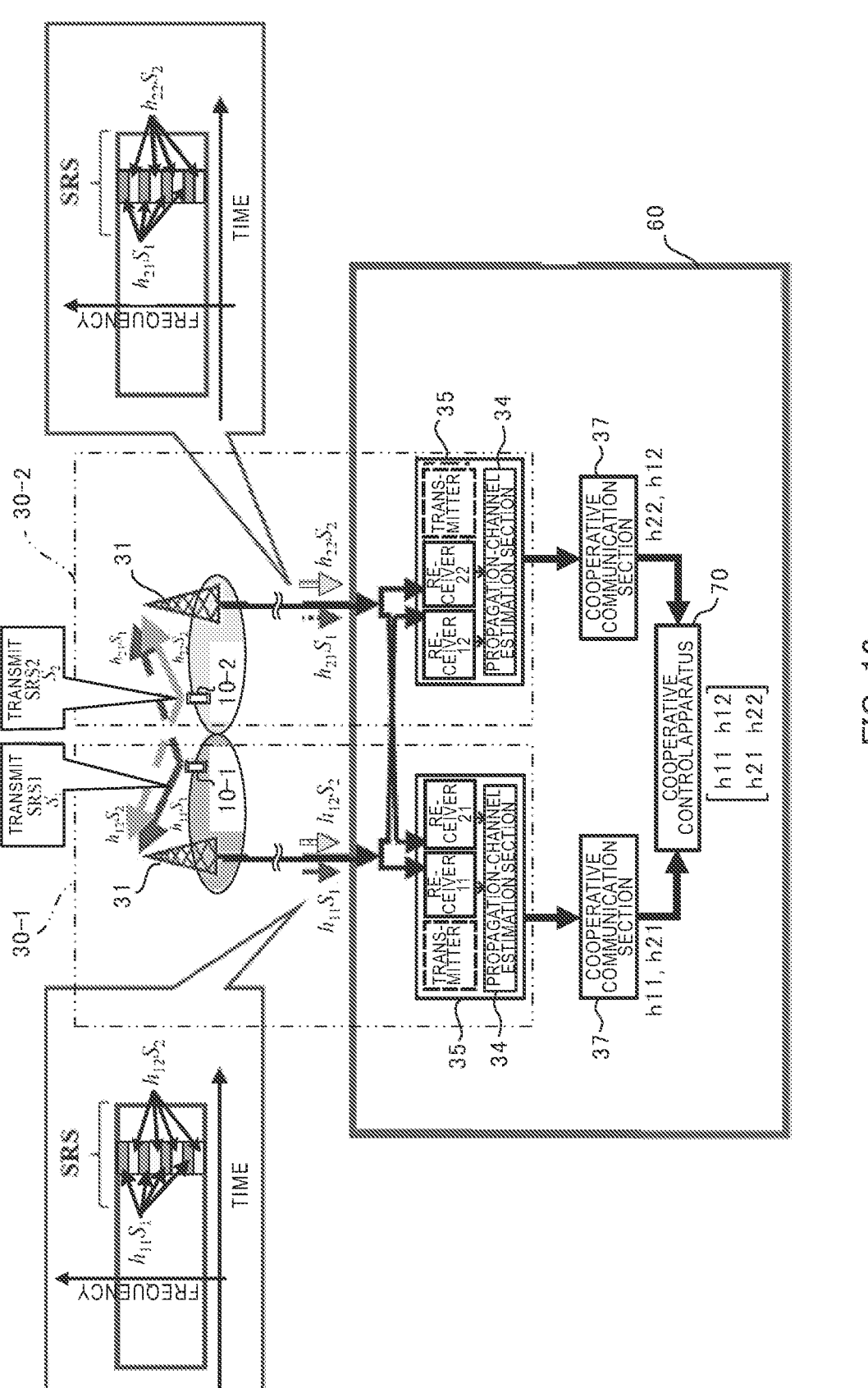
FIG. 12 is an illustration showing an example of obtaining the information of propagation channel using an SRS in the configuration of the embodiment 3.

FIG. 12 is an illustration showing an example of obtaining the information of propagation channels h12 and h21 using the SRS in the configuration of the above-described embodiment 2.

By using the SRS as a predetermined signal for obtaining the information of propagation channels, the first base station 30-1 can easily identify the signals between the signal h11S1 (SRS) from the own cell terminal 10-1 and the signal h12S2 (SRS) from the other cell terminal 10-2. Similarly, the second base station 30-2 can easily identify the signals between the signal h22S2 (SRS) from the own-cell terminal 10-2 and the signal h21S1 (SRS) from the other-cell terminal 10-1. Therefore, each of the base stations 30-1 and 30-2 can generate (obtain) the information of propagation channels h11, h12, h21 and h22 between the base station and the terminals 10-1 and 10-2, with high accuracy.

It is noted that, since the present invention is capable of realizing a high-quality communication on the uplink and downlink between each base station and each terminal by suppressing the interference that may occur when the same frequency band is used with each other between the base stations close to each other by using the interference suppression technology based on the information of propagation-path channels, in the radio communication between the base stations and the terminals of the mobile communication system such as the fifth generation, etc., it is possible to contribute to achieving Goal 9 of the Sustainable Development Goals (SDGs), which is to "Create a foundation for industry and technological innovation".

It is noted that, the process steps and configuration elements of the system, the base station and the terminal described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, gNode B, terminal, management apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like for using to establish the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented in the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: terminal
30-1: first base station
30-2: second base station
31: antenna section
32: receiver
33: transmitter
34: propagation-channel estimation section
35: transceiver 37: cooperative communication section
40, 41: interference canceller
50: base-station cooperative network
51: transportation cable
60: centralized-base station configuration section
62: branching section
70: cooperative control apparatus
71: control apparatus
100: cell
Cd: downlink-interference cancellation signal
Cu: uplink-interference cancellation signal
Id: downlink interference signal
Iu: uplink interference signal
Sd: transmission signal (downlink communication signal)
Su: reception signal (uplink communication signal)
h: information of propagation channel

The invention claimed is:

1. A system comprising a plurality of base stations for performing radio communications with a terminal, the system comprising:
    a signal transportation means for transporting a reception signal received by an antenna section of the base station, between the plurality of the base stations; and
    a base-station cooperative network for transporting information of propagation channels between the terminal and the plurality of the base stations, and
    wherein each of the plurality of the base stations comprises:
        an antenna section;
        a transmitter for performing a process of transmitting a transmission signal from the antenna section;
        a first receiver for processing a reception signal received by the antenna section;
        one or two or more second receivers, each receiver processing a reception signal received by an antenna section of each of one or two or more surrounding base stations and transferred via the signal transportation means; and
        an estimation section for estimating information of propagation channels between an own cell terminal and the plurality of the base stations, based on a reception result of a base-station specific signal received by the first receiver from the own cell terminal and a reception result of base-station specific signals received by the one or two or more second receivers from the own cell terminal.

2. The system according to claim 1,
wherein the base-station cooperative network comprises a cooperative control apparatus that aggregates the information of propagation channels transferred respectively from the plurality of the base stations.

3. The system according to claim 1,
wherein the system comprises a centralized-base station configuration section in which the transmitter, the first receiver, the one or two or more second receivers and the estimation section of each of the plurality of the base stations are centrally disposed at a position away from the antenna section of each of the plurality of the base stations.

4. The system according to claim 3,
wherein the centralized-base station configuration section comprises, for each of the plurality of the base stations, a control apparatus that aggregates the information of propagation channels transferred respectively from the plurality of the base stations.

5. The system according to claim 3,
wherein the base-station cooperative network comprises a cooperative control apparatus that aggregates the information of propagation channels transferred respectively from the plurality of the base stations.

6. The system according to claim 1,
wherein the base-station specific signal is a sounding reference signal (SRS).

7. The system according to claim 1,
a downlink communication signal and an uplink communication signal are multiplexed using a time division duplex (TDD) method, and
the information of propagation channel estimated using an uplink pilot signal is used as information of propagation channel of a downlink in the time division duplex method.

8. The system according to claim 1, comprising:
an interference suppression section for performing an interference suppression processing for at least one of the reception signal received by the base station and the transmission signal transmitted by the base station, based on the information of propagation channels of uplink and downlink which is transferred respectively from the plurality of the base stations.

9. The system according to claim 2,
wherein the base-station specific signal is a sounding reference signal (SRS).

10. The system according to claim 3,
wherein the base-station specific signal is a sounding reference signal (SRS).

11. The system according to claim 4,
wherein the base-station specific signal is a sounding reference signal (SRS).

12. The system according to claim 5,
wherein the base-station specific signal is a sounding reference signal (SRS).

13. The system according to claim 2,
a downlink communication signal and an uplink communication signal are multiplexed using a time division duplex (TDD) method, and
the information of propagation channel estimated using an uplink pilot signal is used as information of propagation channel of a downlink in the time division duplex method.

14. The system according to claim 3,
a downlink communication signal and an uplink communication signal are multiplexed using a time division duplex (TDD) method, and
the information of propagation channel estimated using an uplink pilot signal is used as information of propagation channel of a downlink in the time division duplex method.

15. The system according to claim 4,
a downlink communication signal and an uplink communication signal are multiplexed using a time division duplex (TDD) method, and
the information of propagation channel estimated using an uplink pilot signal is used as information of propagation channel of a downlink in the time division duplex method.

16. The system according to claim 5,
a downlink communication signal and an uplink communication signal are multiplexed using a time division duplex (TDD) method, and
the information of propagation channel estimated using an uplink pilot signal is used as information of propagation channel of a downlink in the time division duplex method.

17. The system according to claim 2, comprising:

an interference suppression section for performing an interference suppression processing for at least one of the reception signal received by the base station and the transmission signal transmitted by the base station, based on the information of propagation channels of uplink and downlink which is transferred respectively from the plurality of the base stations.

18. The system according to claim 3, comprising:

an interference suppression section for performing an interference suppression processing for at least one of the reception signal received by the base station and the transmission signal transmitted by the base station, based on the information of propagation channels of uplink and downlink which is transferred respectively from the plurality of the base stations.

19. The system according to claim 4, comprising:

an interference suppression section for performing an interference suppression processing for at least one of the reception signal received by the base station and the transmission signal transmitted by the base station, based on the information of propagation channels of uplink and downlink which is transferred respectively from the plurality of the base stations.

20. The system according to claim 5, comprising:

an interference suppression section for performing an interference suppression processing for at least one of the reception signal received by the base station and the transmission signal transmitted by the base station, based on the information of propagation channels of uplink and downlink which is transferred respectively from the plurality of the base stations.

\* \* \* \* \*